United States Patent
Hao et al.

(10) Patent No.: US 9,066,160 B2
(45) Date of Patent: Jun. 23, 2015

(54) APPARATUS AND METHOD FOR PROTECTION IN A DATA CENTER

(75) Inventors: Fang Hao, Morganville, NJ (US); Muralidharam S. Kodialam, Marlboro, NJ (US); Tirunell V. Lakshman, Morganville, NJ (US); Haoyu Song, Edison, NJ (US); Martin Zimgibl, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 184 days.

(21) Appl. No.: 13/350,457

(22) Filed: Jan. 13, 2012

(65) Prior Publication Data

US 2013/0011136 A1 Jan. 10, 2013

Related U.S. Application Data

(60) Provisional application No. 61/505,265, filed on Jul. 7, 2011.

(51) Int. Cl.
*H04B 10/00* (2013.01)
*H04Q 11/00* (2006.01)

(52) U.S. Cl.
CPC ..................................... *H04Q 11/00* (2013.01)

(58) Field of Classification Search
USPC ..................................................... 398/66–72
See application file for complete search history.

(56) References Cited

U.S. PATENT DOCUMENTS

| | | | | |
|---|---|---|---|---|
| 7,620,325 | B2 * | 11/2009 | Mizutani et al. | 398/100 |
| 2008/0069564 | A1 * | 3/2008 | Bernard | 398/72 |
| 2009/0052341 | A1 * | 2/2009 | Enqvist | 370/252 |
| 2010/0020690 | A1 * | 1/2010 | Komiya et al. | 370/235 |
| 2010/0232794 | A1 * | 9/2010 | Zheng | 398/68 |
| 2011/0110672 | A1 * | 5/2011 | Blauvelt | 398/202 |
| 2011/0158656 | A1 * | 6/2011 | Vieira et al. | 398/202 |
| 2011/0302346 | A1 * | 12/2011 | Vahdat et al. | 710/301 |
| 2012/0014387 | A1 * | 1/2012 | Dunbar et al. | 370/395.53 |
| 2012/0063306 | A1 * | 3/2012 | Sultan et al. | 370/230 |
| 2012/0072614 | A1 * | 3/2012 | Marr et al. | 709/250 |
| 2012/0096211 | A1 * | 4/2012 | Davis et al. | 710/314 |
| 2012/0099863 | A1 * | 4/2012 | Xu et al. | 398/49 |
| 2012/0128004 | A1 * | 5/2012 | Aybay et al. | 370/401 |

(Continued)

FOREIGN PATENT DOCUMENTS

EP 2148467 A1 1/2010
WO PCT/US2012/043269 2/2013

*Primary Examiner* — Agustin Bello
(74) *Attorney, Agent, or Firm* — Capitol Patent & Trademark Law Firm, PLLC

(57) ABSTRACT

A manner of providing redundancy protection for a data center network that is both reliable and low-cost. In a data center network where the data traffic between numerous access nodes and a network core layer via primary aggregation nodes, an optical network device such as and OLT (optical line terminal) is provided as a backup aggregation node for one or more of the primary aggregation nodes. When a communication path through a primary aggregation node fails, traffic is routed through the optical network device. In a preferred embodiment, a communication link is formed from a plurality of access nodes to a single port of the OLT or other optical network device via an optical splitter that combines upstream transmissions and distributes downstream transmissions. The upstream transmissions from the plurality of access nodes may occur according to an allocation schedule generated when the backup aggregation node is needed.

5 Claims, 4 Drawing Sheets

(56) References Cited

U.S. PATENT DOCUMENTS

| | | | |
|---|---|---|---|
| 2012/0226789 A1* | 9/2012 | Ganesan et al. | 709/223 |
| 2012/0226799 A1* | 9/2012 | Kapur et al. | 709/224 |
| 2012/0243403 A1* | 9/2012 | Hu et al. | 370/217 |
| 2012/0246400 A1* | 9/2012 | Bhadra et al. | 711/104 |
| 2012/0250679 A1* | 10/2012 | Judge et al. | 370/359 |
| 2012/0297043 A1* | 11/2012 | Davis et al. | 709/223 |
| 2012/0303618 A1* | 11/2012 | Dutta et al. | 707/737 |
| 2013/0011136 A1* | 1/2013 | Hao et al. | 398/45 |
| 2013/0097448 A1* | 4/2013 | Davis et al. | 713/323 |
| 2014/0025843 A1* | 1/2014 | Marr et al. | 709/250 |

* cited by examiner

APPARATUS AND METHOD FOR PROTECTION IN A DATA CENTER

CROSS-REFERENCE TO RELATED APPLICATIONS

The present disclosure is related to and claims priority from U.S. Provisional Patent Application Ser. No. 61/505,265, entitled Data Center PON and filed on 7 Jul. 2011, the entire contents of which are incorporated by reference herein.

TECHNICAL FIELD

The present invention relates generally to the field of data centers, and, more particularly, to an apparatus and method for providing redundancy in the data center network.

BACKGROUND

The following abbreviations are herewith defined, at least some of which are referred to within the following description of the state-of-the-art and the present invention.
OLT Optical Line Terminal
ONU Optical Network Unit
PON Passive Optical Network
QoS Quality of Service
ToR Top of Rack Data centers have been in use for many years, and their extensive use and designed capacity continues to increase. A data center is a facility that contains computing or communications equipment, and frequently a large amount of such equipment, that may form a data mass storage facility or part of a telecommunications network. The data center equipment may be segregated in one large room, but may also be distributed throughout several rooms or even in separate buildings, for example to keep the entire data center from being destroyed by a single fire. Many large racks of equipment such as servers may be present in a data center. As might be expected, there is a need to provide for communication between these devices.

Where equipment is mounted in racks, there is often also an access switch connecting all of the devices in the rack and providing for external communication as well. This may be referred to as a ToR (top of rack) switch. In describing the present invention, the term "access node" will be used as there is no requirement that the servers or other data center equipment being supported in this fashion is actually mounted in a physical rack or chassis along with other devices communicating through a given access node. For convenience the collection of devices serving in the data center in this manner may be referred to as the access layer of the data center network.

A relatively small number of routers may be employed in the data center and these may be referred to as core routers or generally as the core layer of the data center network. In between the network core or core layer devices and the many access nodes of the access layer there is frequently an aggregation layer. An aggregation node may be a switch that handles the traffic between a number of access nodes and a core router. An aggregation node aggregates traffic from the access nodes such the core routers do not have to be connected to each of them individually.

An access node such as a ToR switch therefore regularly communicates with the core layer of the data center network via a primary aggregation node. It is important, however, to have at least one redundant path to the core layer in case the primary aggregation node or a communication link through it should fail. A secondary aggregation node is for this reason highly desirable. The secondary aggregation node provides and alternate path to the core layer and is available to perform this function when the primary aggregation node fails or is taken out of service for maintenance. In most cases the secondary aggregation node will be similar or identical to the primary aggregation node. In a typical data center network, there is a secondary aggregation node for each primary aggregation node. Redundancy may also be provided at the core layer in similar fashion, with each primary and secondary aggregation node in communication with at least two core routers.

As might be apparent, a tertiary node would further reduce the likelihood of an interruption in network communications, but normally the cost of another device that would spend most of its time in stand-by mode is prohibitive except for the most sensitive applications. In fact, the need for a secondary node to back up each primary node also represents a major cost that many operators would like to reduce.

Accordingly, there has been and still is a need to address the aforementioned shortcomings and other shortcomings associated with providing communication path redundancy in data center networks. These needs and other needs are satisfied by the present invention.

SUMMARY

The present invention is directed at a manner of providing redundancy protection for a data center network that is both reliable and low-cost. In one aspect the present invention is a data center network that includes at least one OLT (optical line terminal). In one embodiment OLT forms a backup node in an aggregation layer and is configured to perform layer 2 switching for aggregating data traffic between an access layer and a core layer of the data center network. The data center network may also include at least one optical splitter in communication with a port of the at least one OLT and at least one access node. A plurality of access nodes may communicate with the same optical splitter, such that communications between the OLT and the plurality of access nodes are directed to a single port of the OLT. A number of optical splitters may be used so that at least two of the plurality of access nodes in communication with the same optical splitter are also in communication, respectively, with different primary aggregation nodes.

In another aspect, the present invention is a data center network access node including at least one port comprising an optical module and at least one non-optical port.

The optical module is preferably resident on an ONU (optical network unit) line card. The data center network access node may further include instructions executable by a processor and stored in a non-transitory memory device, the instructions when executed generating a request for an optical transmission allocation. The request for an optical transmission allocation is generated for transmission from the at least one port comprising an optical module. The data center network access node may further include a table for storing an optical allocation schedule. In one embodiment, the data center network access communicates with a primary aggregation node via the at least one non-optical port.

In another aspect, the present invention is a method of operating a data center network including determining that a primary communication path from an access node to a core node requires replacement using a backup aggregation node, determining an allocation schedule for upstream optical transmissions from the access node, transmitting the allocation schedule to the access node, and receiving data traffic from the access node via optical transmission. The method may also include determining that the primary communication path no longer requires replacement and revising the allocation schedule to exclude the access node. Determining that a primary communication path from an access node to a core node requires replacement using a backup aggregation node may include receiving a notification from the access node, for example a request for an optical transmission allocation schedule, or from a primary aggregation node.

In a one embodiment, the method further includes receiving data traffic from a plurality of access nodes on a single port of an aggregation node. The data traffic is preferably received during times controlled by the allocation schedule.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed at a manner of providing redundancy protection for a data center network that is both reliable and low-cost. In a typical data center, the data center network employs a backup aggregation node for every primary aggregation node. In accordance with a preferred embodiment of the present invention, an OLT (optical line terminal) is implemented to function in the place of at least two of the backup aggregation nodes, although other embodiments are also possible. An implementation according to a preferred embodiment will now be described with reference to FIGS. 1 and 2.

Figure 1:
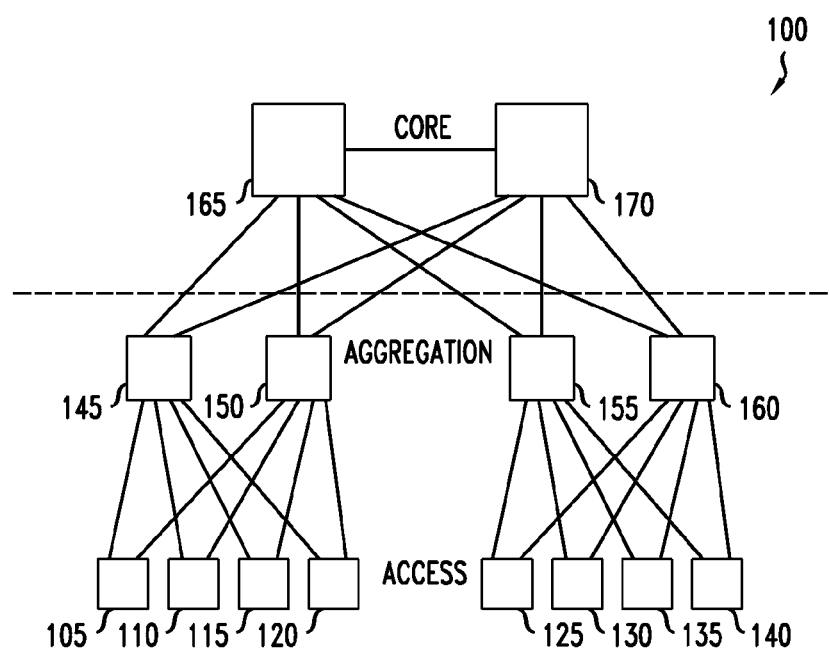
FIG. 1 is a simplified schematic diagram illustrating selected components of a typical data center network according to the existing art.

FIG. 1 is a simplified schematic diagram illustrating selected components of a typical data center network 100 according to the existing art. In this example, data center network includes a number of access nodes referred to as 105, 110, 115, 120, 125, 130, 135, and 140. Note that although eight access nodes are depicted, there may be any number. The access nodes may be, for example, Ethernet ToR devices, each respectively associated with a rack of servers (not shown). Access nodes 105, 110, 115, and 120 are in communication with aggregation nodes 145 and 150. In the example of FIG. 1, aggregation nodes 145 and 150 are Ethernet switches that aggregate the traffic from the access nodes 105, 110, 115, and 120 to the core routers 165 and 170. As shown in FIG. 1, aggregation nodes 145 and are in communication with each other for control purposes and in some instances for routing data traffic.

In normal operation, aggregation node 145 may handle all of such traffic, with aggregation node 150 put into service only when needed. In other cases aggregation nodes 145 and 150 may each handle a portion of the traffic, for example from only two of the illustrated access nodes. In this scenario, when one of aggregation nodes 145 and 150 or its associated path to the core layer fails, the other aggregation node assumes responsibility for all of the traffic until the failure can be remedied.

In like fashion, aggregation nodes 155 and 160 handle traffic between access nodes 125, 130, 135, and 140, and core routers 165 and 170. In this network, aggregation nodes 155 and 160 are in communication with each other, but not with aggregation nodes 145 and 150 (except indirectly via the core routers 165 and 170). Note that core routers 165 and 170 are also arranged to ensure redundancy protection, preferably with either one of them able to support the entire traffic load if the other fails.

Figure 2:
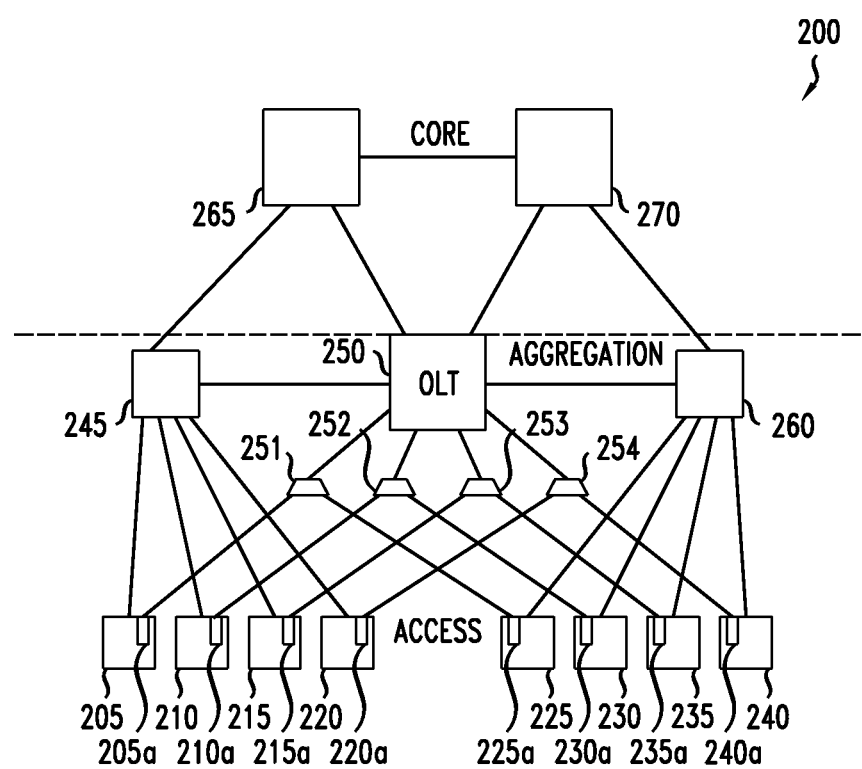
FIG. 2 is a simplified schematic diagram illustrating selected components of a typical data center network according to an embodiment of the present invention.

FIG. 2 is a simplified schematic diagram illustrating selected components of a typical data center network 200 according to an embodiment of the present invention. As with the exemplary network 100 of FIG. 1, in this embodiment data center network 200 includes a number of access nodes referred to as 205 through 240. Note again that although eight access nodes are depicted, there may be any number.

In this embodiment, access nodes 205, 210, 215, and 220 are in communication with a primary aggregation node 245, and access nodes 225, 239, 235 and 240 are in communication with a primary aggregation node 260. Primary aggregation nodes 245 and 260 are Ethernet switches that aggregate the traffic from the respective access nodes with which they are in direct communication.

In the embodiment of FIG. 2, there are two core routers depicted in FIG. 2, core router 265 and core router 270, each of which is in direct communication with a respective one of the primary aggregation nodes 245 and 260. The core routers are also in direct communication with each other for control messaging and for routing traffic as well. It is noted that in this embodiment, primary aggregation node 245 is not in direct communication with core router 270 (and the same is true for primary aggregation node 260 and core router 265). In alternate embodiments (not shown) these additional communication links may be formed, although in the depicted embodiment, the redundancy protection is provided by OLT 250. This aspect of the present invention will now be described in greater detail.

In this embodiment, OLT (optical line terminal) 250 is an OLT as is commonly implemented in a PON (passive optical network). In that regard, the OLT 250 as implemented in accord with the present invention provides a node for receiving and transmitting optical signals, usually on multiple ports. By convention signals transmitted toward the access layer are referred to as downstream, and those received from the access layer as upstream. The OLT 250 in most implementations converts received optical signals to electronic signals for processing and for forwarding as appropriate to the core layer. Downstream signals from core layer are correspondingly converted into optical signals for transmission to the access layer. In a preferred embodiment, the OLT 250 is capable of layer 2 switching for performing its function as an aggregation node in the data center network 200.

In the embodiment of FIG. 2, the OLT 250 also performs a scheduling function.

In a preferred embodiment, downstream transmissions are made to all of the access nodes communicating with the OLT 250, or alternately all of the access nodes accessible through a given port or ports. In this case, the access node regards only those transmissions addressed to it, specifically or as part of a broadcast or multicast, and discards others. Upstream transmissions in this preferred embodiment, however, are transmitted only at times assigned to each individual access node.

In this embodiment, the OLT 250 calculates this schedule and transmits it to each access node so that it can schedule upstream transmissions properly. In a preferred embodiment, the downstream and upstream transmissions are made using different wavelengths so that they do not interfere with each other. In other embodiments, however, the downstream transmissions may be scheduled for time slots not assigned for any upstream transmissions.

Ranging and discovery procedures whereby the OLT in a PON learns of the presence of access nodes and assesses transmission delay times may be used in implementations according to the present invention. In some embodiments, however, they may not be necessary, for example if a set configuration is used or if differences in transmission time may be safely ignored.

In the embodiment of FIG. 2, OLT 250 serves as a backup aggregation node for each of the access nodes 205 through 240. To facilitate this configuration, each of the access nodes includes an ONU (optical network unit) line card, respectively referred to as 205a though 240a. The ONU line card includes an optical module (not separately shown) to convert electronic signals into optical signals for transmission and to convert received optical signals into electronic signals for processing by the access node.

As can be seen in FIG. 2, a communication link between the access nodes and the OLT 250 is in this embodiment formed via an optical splitter. Each optical splitter, 251, 252, 253, and 254 are in communication with a respective port of the OLT 250 and, in this embodiment, with two of the access nodes. The communication links are formed with fiber optic cables. Optical splitter 251, for example, is in communication with access nodes 205 and 225. Likewise, optical splitter 252 serves access nodes 210 and 230, splitter 253 serves access nodes 215 and 235, and splitter 254 serves access nodes 220 and 240.

Each optical splitter, sometimes referred to as a power splitter or splitter/combiner, is in this embodiment a passive device that distributes an optical signal propagated in the downstream direction to each of the access nodes in communication with the splitter. The optical splitters are not necessarily located near to each other, and in most cases can be physically located anywhere between the OLT and the relevant access nodes. Consideration may be given to reducing the length of the multiple fibers downstream of the splitters compared with the single fiber connecting the splitter with the OLT. Note that while each splitter shown in FIG. 2 serves two access nodes, in an actual implementation there may be one or more than 2.

In that regard, note that in this embodiment, the OLT 250 serves as a back-up aggregation node for eight of the access nodes in network 200. It is further noted that in this preferred embodiment, the four access nodes 205, 210, 215, and 220 that use aggregation node 245 as their primary aggregation node are each connected also to a respective one of optical splitters 251 through 254. That is, none of the four access nodes 205, 210, 215, and 220 are served by the same optical splitter or port of OLT 250. Likewise, access nodes 225, 230, 235, and 240 that use aggregation node 260 as their primary aggregation node are each also connected to a respective one of optical splitters 251 through 254.

In this embodiment, the OLT 250 therefore serves as a backup aggregation node to both the primary aggregation nodes 245 and 260. Should either aggregation node or the communication path through it fail, communications between the access layer and the core layer for the nodes are routed through OLT 250. Should both aggregation nodes 245 and 260 (or the communications paths through them) fail at the same time, the scheduling function of the OLT 250 arranges the transmission schedule for itself and the affected access nodes in order to allow OLT 250 to back-up both aggregation nodes.

It should be noted that a single OLT may be used as a backup aggregation node for only a single primary aggregation node or for more than two. The capacity of the OLT to handle data traffic is determinative of how many primary aggregation nodes can be completely backed-up. If for some reason the capacity of the OLT is exceeded, it can allocated transmission time slots to either spread the reduced capacity or QoS (quality of service) across all of the access nodes, or it can prioritize selected access nodes at the expense of others.

In a preferred embodiment OLT 250 is used solely as a back-up node, but in an alternate embodiment, the OLT may be utilized to handle a portion of the access node traffic as part of normal operation. In the event of a failure of another aggregation node, this normal operational traffic may be re-routed through another available primary node, or simply taken into account by the OLT's scheduling function.

Figure 3:
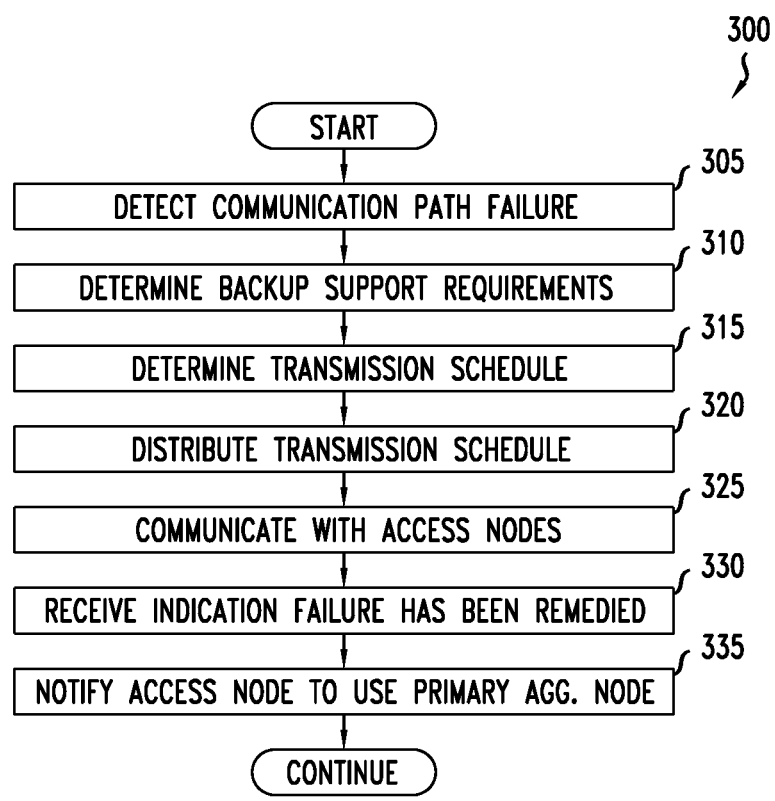
FIG. 3 is a flow diagram illustrating a method according to an embodiment of the present invention.

FIG. 3 is a flow diagram illustrating a method 300 according to an embodiment of the present invention. At START it is presumed that the components necessary to performing the process are available and operational according to this embodiment. The process then begins detecting by the OLT (step 305) that a communication path failure has occurred (or will occur). As used herein, failure may mean a complete failure of an aggregation node or link along a communication path, or to a degree of degradation below an acceptable level of transmission quality. A "failure" may be planned in advance if, for example, an aggregation node is to be taken out of service for maintenance. "Detecting" the failure may then occur in a variety of ways, for example receiving a message from an access or aggregation node, or failure to receive a response to an inquiry or heartbeat message sent to an aggregation node.

However it occurs, in this embodiment when a failure is detected at step 305, the OLT determines (step 310) which of the access nodes will require back-up support. Note that if the OLT is already providing backup support at the time a failure indication arrives, this step also includes determining whether this backup support is still required. In some embodiments, if the OLT is handling normal traffic this step may also include (not separately shown) off-loading some or all of the traffic that does not require use of the OLT as a backup aggregation node.

In the embodiment of FIG. 3, the OLT then calculates a transmission schedule (step 315) for at least upstream transmissions from the access nodes. As mentioned above, in some embodiments, the transmission schedule may also include downstream transmissions by the OLT. In formulating the upstream transmission schedule, the OLT may allot the same amount of time to each access node, but in other cases may allot more time to those access nodes granted a higher priority lever or assigned a higher QoS level. More time may of course be allocated by relatively-more or relatively-longer transmission windows. In some embodiments, the OLT may monitor the traffic level and allocate more transmission time to those access nodes that have higher traffic level, and this allocation may be changed over time as traffic levels vary.

In the embodiment of FIG. 3, the formulated (or re-formulated, if applicable) schedule is transmitted (step 320) to the affected access nodes. A reply (not shown) may in some implementations be required to confirm that the schedule has been received by each access node and that the access nodes are transmitting on their allotted time slot. The OLT then begins communicating (step 325) with the affected access nodes according to the established schedule.

Note that in some embodiments, the OLT does not calculate the transmission schedule, but rather this is performed in some other network element and provided to the OLT and other affected network nodes.

In the embodiment of FIG. 3, the OLT continues to act as the backup aggregation node for the affected access nodes in this fashion, though in some cases re-calculating the transmission schedule (not shown) as necessary. At some point, it is presumed the failure of the link or node will be remedied, and the OLT will receive (step 325) an indication that the primary communication path for some or all of the affected access nodes has been remedied. The transmission schedule may then be re-calculated (step 330), although if no access nodes require a backup aggregation node this re-calculation may be a trivial event. A message (step 335) is then sent to some or all of the access nodes notifying them that the OLT will no longer act as a backup aggregation node and that further communications should instead be transmitted over the primary communication path via the primary aggregation node. Although not shown in FIG. 3, in some embodiments the OLT may at this time re-commence carrying normal traffic if the data center network routes traffic in this way.

Figure 4:
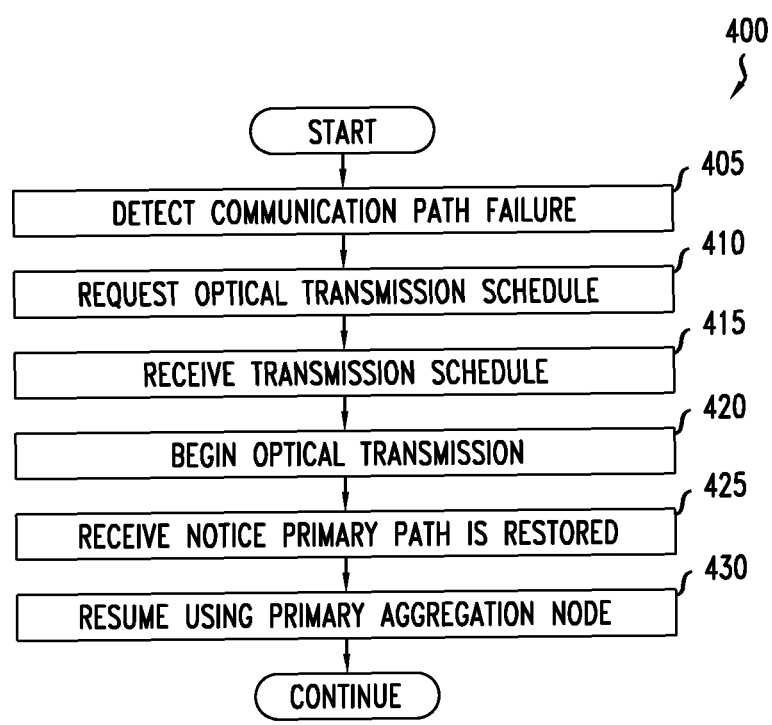
FIG. 4 is a flow diagram illustrating a method according to an embodiment of the present invention.

As should be apparent, method 300 of FIG. 3 operates from the perspective of the OLT. A process from the perspective of the access node is described in reference to FIG. 4. FIG. 4 is a flow diagram illustrating a method 400 according to an embodiment of the present invention. At START it is presumed that the components necessary to performing the process are available and operational according to this embodiment. The process then begins detecting by the access node (step 405) that a communication path failure affecting its communications through the primary access node has occurred (or will occur).

When the access node becomes aware of a communication path failure has occurred (or is imminent), the access node requests (step 410) an optical transmission schedule, usually from the OLT. Since this request is mostly likely sent over an optical transmission line, the request may be sent during a window established for such requests. Alternately, a different type of control path may be configured in advance.

In the embodiment of FIG. 4, the access node should then receive a schedule (step 415) for upstream transmission to the OLT over the optical channel and begins transmitting (step 420) according to this schedule. Using the OLT as a backup aggregation node may then continue until a message is received (step 425) that a primary communication path has been restored, at which point the access node resumes (step 430) communication via the primary aggregation node.

Note that the process of method 400 is generally if not perfectly compatible with the process of method 300. While similar in operation, they are nonetheless representative of different embodiments of the present invention and a step present or absent in one is not necessarily present or absent in the other. Further variation is, of course, possible, for example in some embodiments not all of the steps shown in the figures are necessary, and in other embodiments additional steps may be added. Also, unless recited or implied otherwise in a particular embodiment, the steps of the methods may be performed in any logically-consistent order.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A data center comprising:
a plurality of primary aggregator nodes, each aggregator node in communication with a separate grouping of a plurality of top-of-rack, access nodes in a data center;
one or more backup aggregator nodes, each of the backup aggregator nodes comprising an OLT (optical line terminal, wherein each backup aggregator node is coupled to at least two primary aggregator nodes;
a plurality of top-of-rack, access nodes in the data center, each access node associated with one of the primary aggregator nodes and also associated with one of the backup OLT aggregator nodes; and
at least one data center core router in the data center, wherein the OLT is configured to perform layer 2 switching for aggregating data traffic between the plurality of top-of-rack, access nodes and the core router in the data center upon a communication failure with one of the primary aggregator nodes.

2. The data center of claim 1, wherein the at least one backup node OLT is operable to function as a backup for at least two primary aggregator nodes.

3. The data center of claim 1, further comprising at least one optical splitter in communication with a port of the at least one OLT backup aggregator node and at least one of the top-of-rack, access nodes.

4. The data center of claim 3, further comprising two or more of the plurality of top-of-rack, access nodes in communication with the same optical splitter.

5. The data center of claim 4, wherein at least two of the plurality of top-of-rack, access nodes in communication with the same optical splitter are also in communication, respectively, with different primary aggregation nodes.

* * * * *